(12) United States Patent
Jordan (10) Patent No.: US 8,281,454 B1
(45) Date of Patent: Oct. 9, 2012

(54) MULTI-BLADE ICE REMOVING WINDSHIELD WIPER ASSEMBLY

(76) Inventor: Steve Jordan, Springdale, WA (US)

( * ) Notice: Subject to any disclaimer, the term of this patent is extended or adjusted under 35 U.S.C. 154(b) by 232 days.

(21) Appl. No.: 12/660,007

(22) Filed: Feb. 19, 2010

(51) Int. Cl.
*B60S 1/28* (2006.01)
*B60S 1/38* (2006.01)

(52) U.S. Cl. ............... 15/250.41; 15/250.4; 15/250.361

(58) Field of Classification Search .............. 15/250.4, 15/250.41, 250.22, 250.245, 250.361, 250.38, 15/250.39, 250.44, 250.31
See application file for complete search history.

(56) References Cited

U.S. PATENT DOCUMENTS

| | | | | |
|---|---|---|---|---|
| 2,689,369 A | * | 9/1954 | Bick | 15/245 |
| 3,115,656 A | * | 12/1963 | McKinstry | 15/115 |
| 3,139,644 A | * | 7/1964 | Smith | 15/250.3 |
| 4,745,653 A | * | 5/1988 | Bliznak | 15/250.04 |
| 5,732,437 A | * | 3/1998 | Jonasson et al. | 15/250.201 |
| 6,233,779 B1 | * | 5/2001 | Nelson, Sr. | 15/250.41 |
| 7,334,288 B2 | * | 2/2008 | Rudd et al. | 15/250.41 |

FOREIGN PATENT DOCUMENTS

SU 1162643 * 6/1985
* cited by examiner

*Primary Examiner* — Gary Graham
(74) *Attorney, Agent, or Firm* — William A. Jeckle

(57) ABSTRACT

A multi-blade ice removing windshield wiper assembly has a support frame carrying an axially rotatable elongate body having three radially extending spacedly arrayed windshield engaging blades. A toothed blade having a plurality of teeth scores accumulated frost and ice on a windshield while windshield wiper arm moves in a first direction. Spacedly adjacent shaving blade clears away the scored frost and ice from the windshield as the windshield wiper arm moves in the second opposite direction. Third flexible wiper blade removes rain and water from the windshield and may be selectively engaged when the frost and ice removing blades are not needed. Locking mechanism positionally secures the elongate body within the support frame to prevent unwanted axial rotation of the body within the support frame.

12 Claims, 5 Drawing Sheets

MULTI-BLADE ICE REMOVING WINDSHIELD WIPER ASSEMBLY

RELATED APPLICATIONS

There are no other patent applications related hereto filed in the United States of America or in any other country.

BACKGROUND OF INVENTION

1. Field of Invention

This invention relates to brushes, and more particularly to a windshield wiper blade assembly having plural windshield engaging blades for removing frost, ice, liquid and other visibility impairing contaminants from a vehicle windshield.

2. Background and Description of Prior Art

In northern climates especially during the Fall, Winter and early Spring frost and ice form on the windshields of vehicles. When a vehicle has been left outside overnight, condensation on the vehicle may freeze and frost accumulation can be significant. When a warm vehicle is left outside overnight melted ice and snow may refreeze on the vehicle windshield and the accumulation may be even more significant.

Common methods to remove frost and ice from a vehicle windshield include using a hand held scraper to manually remove the accumulation, or allowing the vehicle to "warm up" sufficiently for the vehicle defroster to become operative to melt the accumulation. Unfortunately, the first method requires a person to be outside the vehicle enduring the elements and perhaps compromising personal safety. The second method requires some period of time for the vehicle motor to warm the heating/cooling system sufficiently for the defroster to become operational. In many instances the period of time may be significant and the amount of fuel consumed to heat the vehicle may also be significant.

Known vehicle windshield wipers have a single flexible windshield engaging blade, typically made of rubber, carried within an elongate frame and are primarily designed to remove liquids from a windshield. Such known windshield wiper blades may brush-away loose accumulations of light snow, but such wiper blades are not sufficiently rigid to "bite" into and remove frost and ice adhering to the windshield. Instead, known windshield wipers typically only pass back and forth over the outer surface of the accumulated frost and ice. A user may apply windshield wiper fluid to melt the accumulated frost and ice so that the liquid removing blade may at least function, but if the outside temperature is sufficiently low, the windshield wiper fluid may freeze and add to the accumulated frost and ice making visibility worse and making the windshield wiper even less effective.

Known "winter wiper blade" assemblies similarly have a single flexible wiper blade supported by an elongate frame. A flexible rubberized boot extends from elongate side portions of the flexible blade and encompasses the elongate frame to prevent snow and ice from accumulating within the frame and interfering with operation of the blade. Despite their name, winter blade assemblies are likewise not designed to remove frost and ice from a vehicle windshield and like standard wiper blades, known winter wiper blades, have insufficient rigidity to "bite" into accumulated frost and ice.

What is needed is a windshield wiper assembly that is releasably attachable to a vehicle windshield wiper arm that effectively removes frost and ice from a windshield using the back-and-forth motion provided by the windshield wiper arm. The assembly must also remove liquids and other visibility impairing contaminants from the vehicle windshield.

My invention overcomes various of the aforementioned drawbacks to known windshield wiper blade assemblies by providing an multi-blade ice removing windshield wiper assembly having plural spaced apart windshield engaging blades. The blades of my invention have sufficient rigidity to "bite" into and remove frost and ice accumulated on a vehicle windshield and my invention has a replaceable flexible windshield wiper blade for removing liquids from the windshield.

A toothed blade "scores" accumulated frost and ice while the windshield wiper arm moves in a first direction. A shaving blade removes the scored frost and ice from the windshield as the windshield wiper arm moves in a second opposite direction. A third flexible liquid removing wiper blade is may be optionally engaged to remove liquids from the windshield after the frost and ice have been removed, or in situations where there is no frost or ice.

My invention does not reside in any one of the identified features individually but rather in the synergistic combination of all of its structures, which give rise to the functions necessarily flowing therefrom as hereinafter specified and claimed.

SUMMARY

A multi-blade ice removing windshield wiper assembly has a support frame carrying an axially rotatable elongate body having three spacedly arrayed generally radially extending windshield engaging blades. A toothed blade having a plurality of spaced apart teeth scores frost and ice accumulated on a vehicle windshield while windshield wiper arm moves in a first direction. Spacedly adjacent parallel, shaving blade removes the scored frost and ice from the windshield as the windshield wiper arm moves in a second direction. Third flexible wiper blade removes liquid from the windshield and may be selectively engaged when the frost and ice removing blades are not in use. Locking means positionally secures the body within the support frame to maintain use of the selected blade configuration and to prevent unwanted axial rotation of the elongate body within the support frame.

In providing such an apparatus it is:

a principal object to provide a windshield wiper assembly for removing frost and ice from a vehicle windshield using the back-and-forth motion of a windshield wiper arm.

a further object to provide such a windshield wiper assembly having plural operator selected windshield engaging blades.

a further object to provide such a windshield wiper assembly having a toothed blade and a shaving blade that work in combination to remove frost and ice from a vehicle windshield.

a further object to provide such a windshield wiper assembly having a toothed blade defining a plurality of teeth for scoring frost and ice on a vehicle windshield as the windshield wiper assembly moves in a first direction.

a further object to provide such a windshield wiper assembly having a shaving blade for removing scored frost and ice from a windshield as the windshield wiper assembly moves in a second direction.

a further object to provide such a windshield wiper assembly wherein the body is selectively axially rotatable within support frame.

a further object to provide such a windshield wiper assembly wherein the body has limited axial rotation in a first direction within the support frame as the wiper arm moves in a first direction causing the toothed blade to score frost and ice on the vehicle windshield.

a further object to provide such a windshield wiper assembly wherein the body has limited axial rotation in a second direction as the wiper arm moves in a second direction causing the shaving blade to remove scored frost and ice from the vehicle windshield.

a further object to provide such a windshield wiper assembly wherein a flexible liquid removing windshield wiper blade is carried spacedly adjacent the toothed blade and spacedly adjacent the shaving blade.

a further object to provide such a windshield wiper assembly having a replaceable flexible liquid removing windshield wiper blade.

a further object to provide such a windshield wiper assembly having a locking means to selectively engage the desired windshield engaging blade configuration.

a still further object to provide a multi-blade ice removing windshield wiper assembly that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout.

DESCRIPTION OF PREFERRED EMBODIMENT

A multi-blade ice removing windshield wiper assembly releasably attachable to a vehicle windshield wiper arm 11 provides a support frame 12, an elongate body 18 carrying three spacedly arrayed windshield contacting blades 21, 25, 26 and a locking means 33 for selectively engaging a windshield contacting blade 21, 25, 26 configuration.

Support frame 12 is elongate having a back portion 49, a first end 13 portion and a spaced apart second end 14 portion. First end portion 13 and second end portion 14 extend generally perpendicularly, in the same direction, from back portion 49. An axle hole (not shown) is defined in each end portion 13, 14 to pivotally carry the elongate body 18 therebetween on pivot axles 27, 28 extending through the axle holes. (not shown).

Wiper arm interconnection 43 is carried on the back portion 49 of support frame 12 between the opposing end portions 13, 14 and may be any of a variety of known wiper arm interconnections 43 such as, but not limited to, a pair of spaced apart parallel wiper arm tabs 48, each defining an axle hole (not shown) for a wiper arm axle 50 extending therethrough and therebetween, that releasably interconnects with a mating portion (not shown) of the wiper arm 11.

Figures 1, 17, 18:
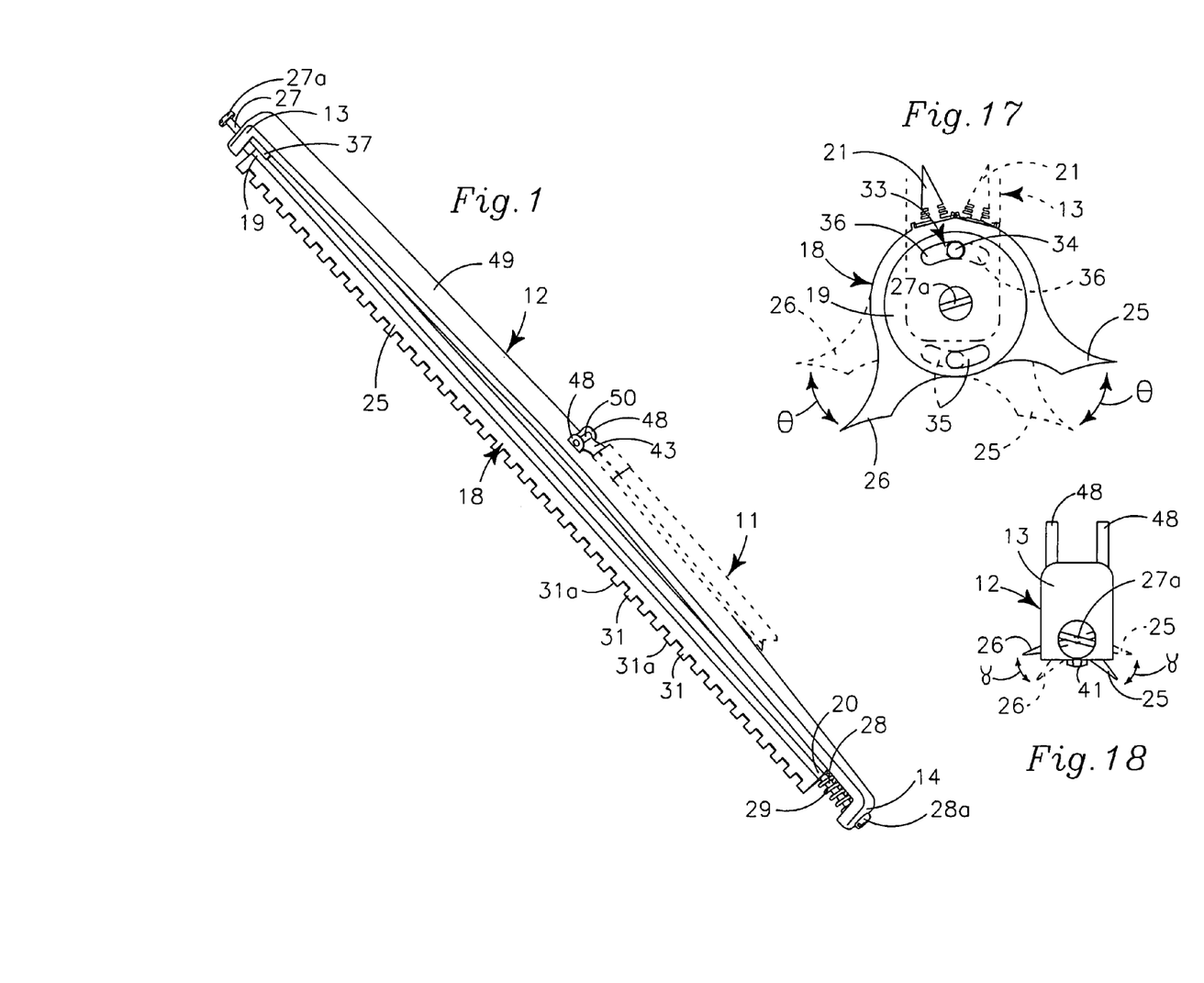
FIG. 1 is an isometric side, second end and back view of my multi-blade ice removing windshield wiper assembly attached to a vehicle windshield wiper arm, shown in dashed outline.
FIG. 17 is a view similar to that of FIG. 16 showing angle θ.
FIG. 18 is a view similar to that of FIG. 10 showing angle γ.
Figures 2, 3, 4, 5:
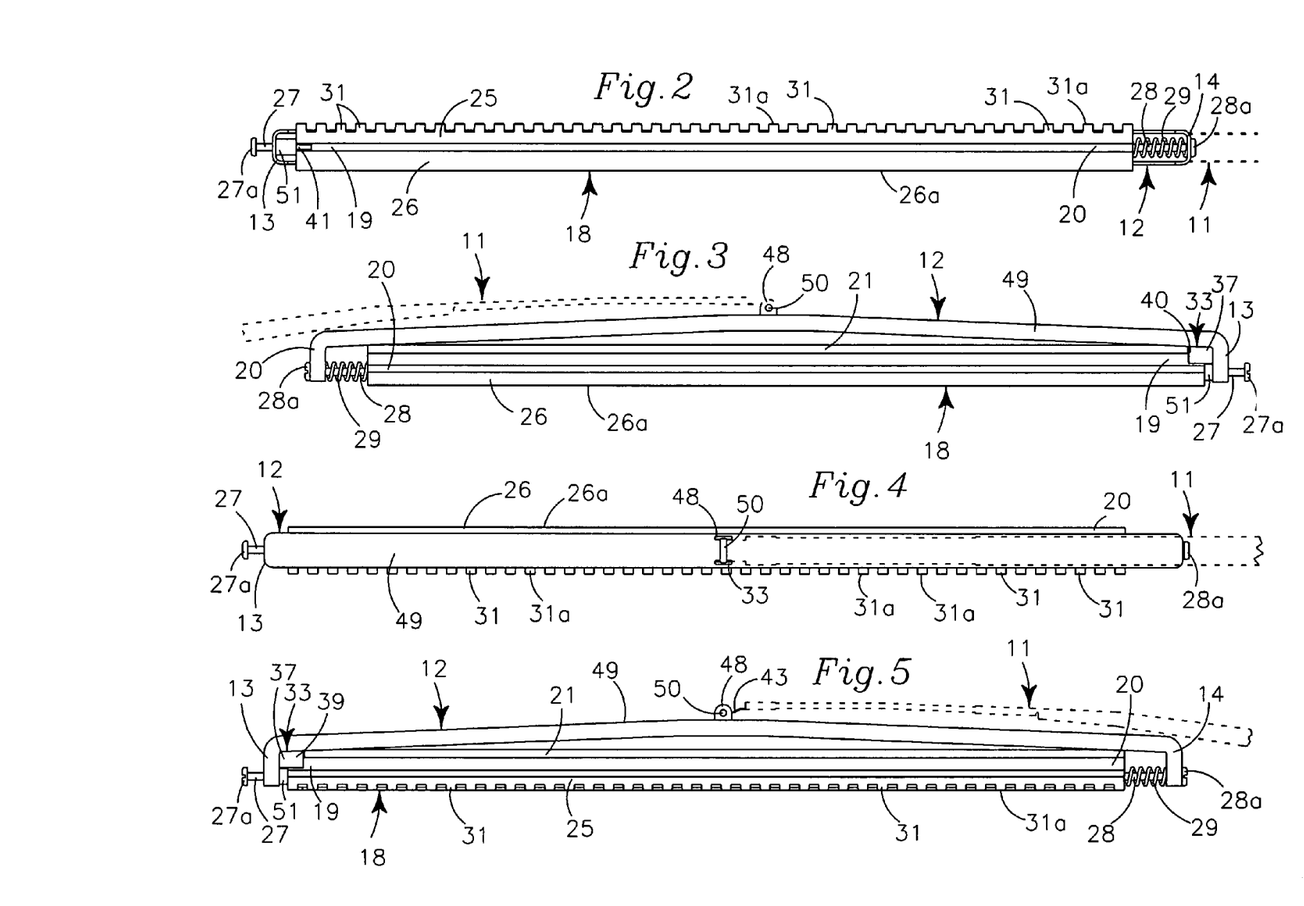
FIG. 2 is an orthographic front view of my multi-blade ice removing windshield wiper assembly showing the toothed blade and shaving blade positioned for use.
FIG. 3 is an orthographic right side view thereof.
FIG. 4 is an orthographic back view thereof.
FIG. 5 is an orthographic left side view thereof.
Figure 6:
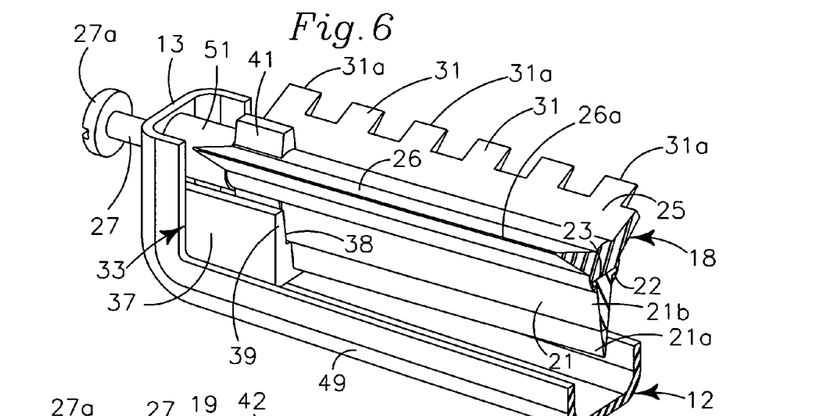
FIG. 6 is an enlarged isometric partial cut-away cross section view of the first ends of the body and support frame showing the body engaged with the locking mechanism and oriented for use of the toothed blade and shaving blade configuration.

Body 18 has a first end portion 19 and an opposing second end portion 20. When viewed from an end, (FIGS. 6-9) the body 18 has three spacedly arrayed windshield engaging blades 21, 25, 26 that extend somewhat radially from axis (not shown) of the body 18. The blades 21, 25, 26 are not equally spaced from one another. (FIGS. 6, 17). The arc of separation between toothed blade 25 and shaving blade 26 is less than 180° and is preferably about 110° so that the toothed blade 25 and shaving blade 26 may simultaneously contact the vehicle windshield 44 while preventing portion of the body 18 between the blades 25, 26 from frictionally contacting the vehicle windshield 44.

Toothed blade 25 and shaving blade 26 are spacedly adjacent and parallel to one another and extend somewhat radially outwardly from the body 18. The toothed blade 25 and shaving blade 26 are semi-rigid in construction but have sufficient flexibility to conform to the curvilinear surface of the windshield 44 to maintain continuous frictional contact therebetween along the entire length of the toothed blade 25 and shaving blade 26.

Figures 9, 12:
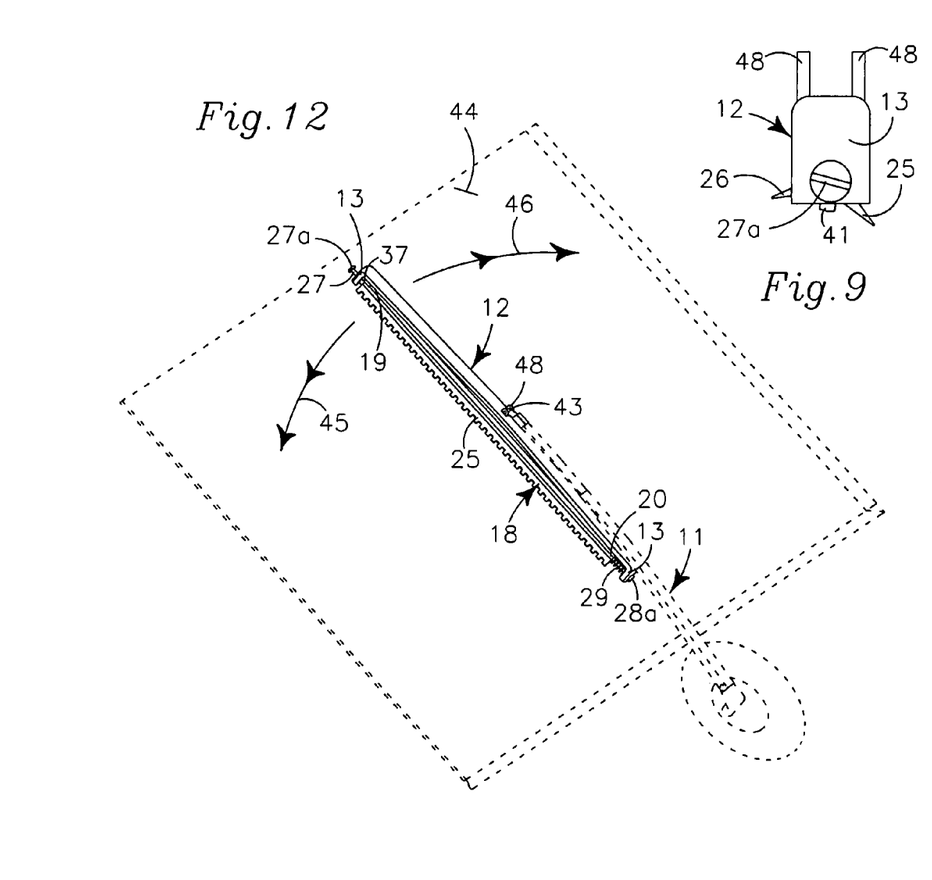
FIG. 9 is an orthographic first end view of my multi-blade ice removing windshield wiper assembly showing the body rotated axially clockwise within the support frame for engagement of the toothed blade with frost and ice on the windshield as wiper arm moves in a first direction.
FIG. 12 is an isometric environmental view of my multi-blade ice removing windshield wiper assembly attached to a vehicle windshield wiper arm and positioned on a vehicle windshield with arrows representing the first direction of movement and the second direction of movement provided by the windshield wiper arm.

As shown in FIG. 6 the toothed blade 25 defines a plurality of spaced apart teeth 31 each of which has a scoring edge 31a opposite the body 18 and separated from one another by gap 32. Teeth 31 are designed and configured to score frost and ice that has accumulated on the vehicle windshield 44. In the preferred embodiment the teeth 31 are rectilinear in configuration although it is anticipated the teeth 31 may have other configurations including, but not limited to triangles and scallops. Scoring of frost and ice by drawing the toothed blade 25 in a first direction 45 (FIG. 12) across the vehicle windshield 44 disrupts the structural integrity of the frost and ice by making cuts and gouges therein and by causing cracks therein. Scoring eases removal of the frost and ice from the windshield 44 through subsequent action of the shaving blade 26 moving in second direction 46. (FIG. 12).

The shaving blade 26 (FIG. 6) is carried by the body 18 spacedly adjacent the toothed blade 25 and extends parallel thereto. The shaving blade 26 has a windshield engaging edge portion 26a opposite the body 18, and like the toothed blade 25 has sufficient flexibility to conform to the curvilinear surface of the windshield 44 while maintaining a semi-rigid windshield engaging edge portion 26a. Spring biasing of the wiper arm 11 exerted on the support frame 12 and body 18 causes the entire length of the shaving blade 26 to frictionally engage with the previously scored frost and ice on the windshield 44 as the body 18 is drawn in a second direction 46 by the windshield wiper arm 11. Disruption of the structural integrity of the frost and ice on the windshield 44 by the scoring of the toothed blade 25 weakens the adherence of the frost and ice to the windshield 44 allowing the shaving blade 26 to penetrate through the frost and ice to be in direct physical contact with the windshield 44 and separate the frost and ice therefrom as the assembly moves in the second direction 46.

In the preferred embodiment the toothed blade 25 and the shaving blade 26, are integral with the body 18, which is formed of a semi-rigid material such as, but not limited to, high density polyethylene. Other materials such as nylon, and polymerized rubber that exhibit similar desirable characteristics may likewise be used to form body 18 and blades 25, 26. The essential feature is that the material have sufficient durability and rigidity to maintain the teeth 31 on the toothed blade 25 and a windshield engaging edge portion 26a on the shaving blade. The material must also be resistant to UV deterioration and not become brittle at sub freezing temperatures. Such characteristics may also be achieved and enhanced with known chemicals and chemical treatments.

Toothed blade 25 and shaving blade 26, in combination, score and remove accumulated frost and ice from the vehicle windshield 44. When the ice removing blades 25, 26 are not needed, the body 18 may be rotated axially within the support frame 12 about pivot axles 27, 28 so that the flexible wiper blade 21 is oriented to communicate with the windshield 44 and remove liquid such as rain and the like therefrom.

Figure 7:
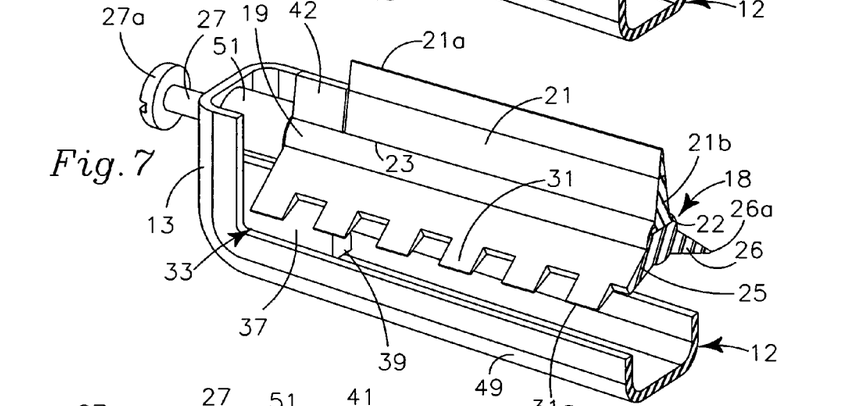
FIG. 7 is a view similar to that of FIG. 6 showing the body rotated axially for use of the flexible liquid removing wiper blade.
Figure 13:
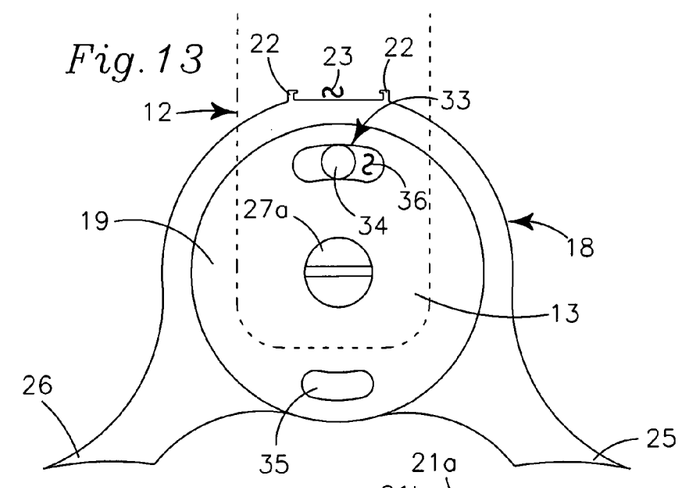
FIG. 13 is an enlarged orthographic first end view of a second embodiment of my multi-blade ice removing windshield wiper assembly, less the flexible liquid removing wiper blade, showing a second locking means.

Wiper blade 21 is replaceable and is releasably carried in a wiper blade slot 23 defined in the body 18 diametrically opposite a point (not shown) medially between the toothed blade 25 and the shaving blade 26. (FIGS. 7, 13). The wiper blade 21 is of known manufacture, is commercially available in a variety of sizes and is positionally maintained in the wiper blade slot 23 by a pair of opposing laterally inwardly extending flanges 22 (FIG. 13) carried by the body 18 that communicate with base portion 21b of wiper blade 21. Retaining clips (not shown) of known manufacture positionally maintain the wiper blade 21 in the wiper blade slot 23 and prevent its axial movement therein and facilitate user removal and replacement of the wiper blade 21 as necessary.

Figure 8:
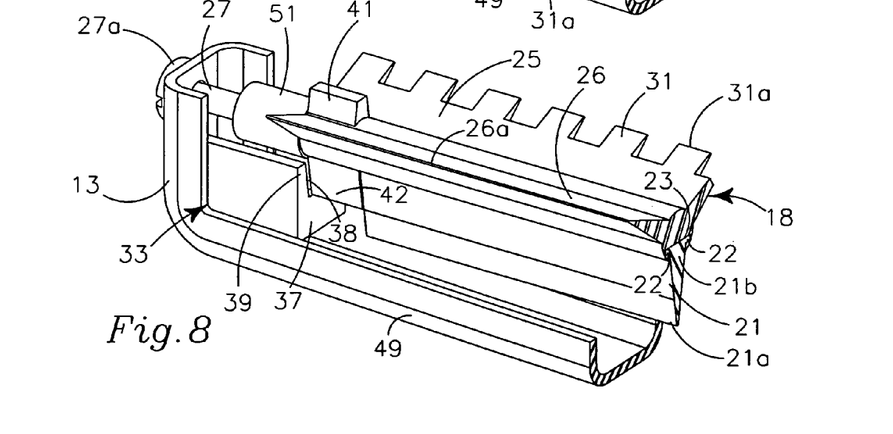
FIG. 8 is a view similar to that of FIG. 6 showing the body displaced axially within the support frame toward the second end portion and disengaged from the locking mechanism for axial rotation of the body to select a blade configuration.

Pivot axle 27 carried at the first end 19 of the body 18 extends axially therefrom through an axle hole (not shown) defined in first end portion 13 of support frame 12 and provides a rotatable interconnection between the body 18 and the first end portion 13 of the support frame 12. (FIGS. 6, 7, 8). Radially extending flange 27a is carried on end portion of pivot axle 27 opposite the body 18 to prevent the pivot axle 27 and body 18 from separating from the support frame 12. As shown in FIGS. 6, 7 and 8, spacer 51 is axially carried on pivot axle 27 between the first end portion 19 of body 18 and first end portion 13 of support frame 12. Pivot axle 28 carried at the second end 20 of the body 18 extends axially therefrom through a similar axle hole (not shown) defined in second end portion 14 of the support frame 12 and provides a rotatable interconnection between the body 18 and the second end 14 of the support frame 12.

Biasing spring 29 (FIGS. 1, 2, 3, 5) is axially carried on pivot axle 28 between the second end 20 of the body 18 and the second end portion 14 of the support frame 12. Biasing spring 29 is extensive to bias the first end 19 of the body 18 toward the first end portion 13 of the support frame 12 providing a locking means to prevent undesirable rotation of the body 18 within the support frame 12.

Locking means 33 (FIGS. 6, 7, 8) prevents undesirable rotation of the body 18 within the support frame 12 and allows the user to select for use either the toothed blade 25 and shaving blade 26 which operate in combination, or the flexible liquid removing wiper blade 21.

In a first embodiment, the locking means 33 (FIGS. 6, 7, 8) comprises yoke 37 defining space 38 between two spaced apart yoke arms 39, 40. Yoke 37 is immovably carried by the support frame 12 at intersection of the first end portion 13 and the back portion 49, and oriented so that the yoke arms 39, 40 extend opposite the back portion 49. A first locking vane 41 is structurally carried at the first end 19 of the body 18 diametrically opposite the wiper blade slot 23 and extends generally radially from the body 18. A similar second locking vane 42 is structurally carried at the first end portion 19 of body 18 adjacent the wiper blade slot 23 and similarly extends radially from the body 18 diametrically opposite first locking vane 41.

Figure 10:
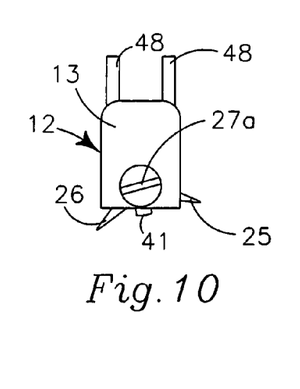
FIG. 10 is a view similar to that of FIG. 9 showing the body rotated axially counter-clockwise within the support frame for engagement of the shaving blade with frost and ice on the windshield as wiper arm moves in a second direction.
Figure 11:
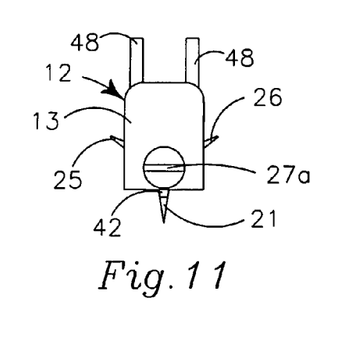
FIG. 11 is a view similar to that of FIG. 9 showing the liquid removing wiper blade selected for use.

The body 18 is axially positionally maintained in the support frame 12 by engagement of one vane 41, 42 in space 38 defined between yoke arms 39, 40. Biasing spring 29 on pivot axle 28 at the second end 20 of the body 18 positionally maintains engagement of the vane 41, 42 within the yoke 37. Side-to-side dimension of space 38 defined between the yoke arms 39, 40 is slightly greater than the side to side thickness of vane 41, 42 which allows the body 18 to axially rotate in a limited arc γ within the support frame 12 as the wiper arm 11 moves back and forth across the windshield 44. (FIG. 18). The limited axial rotation of the body 18 through arc γ causes the toothed blade 25 to more aggressively engage with and "bite" into the frost and ice as the wiper arm 11 moves in a first direction 45 (FIGS. 9, 12, 18) and allows the shaving blade 26 to more aggressively engage with and "bite" into the frost and ice as a wiper arm 11 moves in the second direction 46. (FIGS. 10, 12, 18). The limited axial rotation also causes the shaving blade 26 to lift off the surface of the windshield 44 when the wiper arm 11 is moving in a first direction 45, (FIG. 9) and causes the toothed blade 25 to lift off the windshield 44 when the wiper arm 11 moves in a second direction 46. (FIG. 10). The limited axial rotation of the body 18, when the flexible liquid removing wiper blade 21 is in use, does not negatively affect the efficiency of the wiper blade 21.

In a second embodiment (FIGS. 13-16) the locking means 33 has two axially extending pegs 34, 35 that are spaced apart from and parallel to the pivot axle 27. Pegs 34, 35 are diametrically opposite one another on the first end 19 of the body 18 and releasably engage in an arcuate elongated hole 36 defined in the first end portion 13 of the support frame 12. Peg 34 or peg 35, is positionally maintained in engagement with the elongated hole 36 by biasing spring 29 carried on pivot axle 28 at the second end 20 of the body 18. Spacer 51 is not required with second embodiment of locking means 33.

The arcuate shape of the elongated hole 36 allows the body 18 to rotate axially in a limited arc θ within the support frame 12 as the wiper arm 11 moves in a first direction 45 and second direction 46 across the windshield 44.

Figure 14:
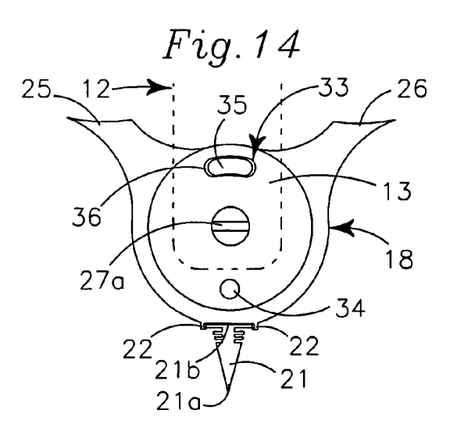
FIG. 14 is a view similar to that of FIG. 11 showing the second embodiment with the liquid removing wiper blade selected for use and showing the first end portion of the support frame in dashed outline.
Figure 15:
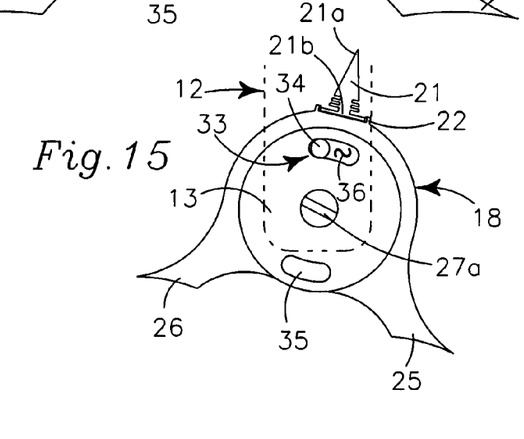
FIG. 15 is a view similar to that of FIG. 9 showing the second embodiment body rotated clockwise within the support frame shown in dashed outline.
Figure 16:
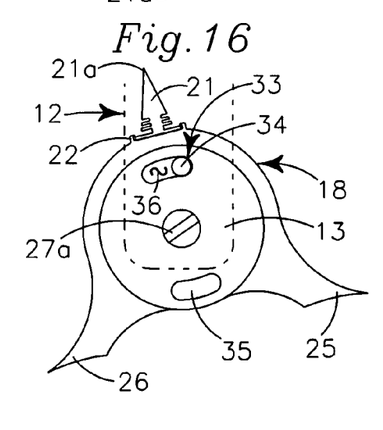
FIG. 16 is a view similar to that of FIG. 10 showing the second embodiment body rotated counter-clockwise within the support frame shown in dashed outline.

Peg 34 is generally round in configuration and facilitates limited axial rotation of body 18 through angle θ when the toothed blade 25 (FIG. 15, 17) and shaving blade 26 (FIG. 16, 17) are selected for use. Peg 35 has a periphery shaped similar to elongated arcuate hole 36 to limit the axial rotation of the body 18 when the liquid removing windshield wiper 21 is selected for use. (FIG. 14). The limited axial rotation of the body 18 (FIGS. 15, 16, 17) causes the toothed blade 25 to more aggressively engage with and "bite" into the frost and ice on the windshield 44 as the wiper arm 11 moves in the first direction 45. The limited axial rotation of the body similarly allows the shaving blade 26 to more aggressively engage with and "bite" into the scored frost and ice as a wiper arm 11 moves in the second direction 46. Selection of the wiper blade configuration to be used is similar to that discussed previously with the first embodiment.

Having described the structure of my multi-blade ice removing windshield wiper assembly, its operation may be understood.

A user interconnects the support frame 12 carrying the body 18 to the windshield wiper arm 11 of the vehicle by means of the wiper arm interconnection 43.

User grasps the body 18 in one hand and the support frame 12 in the other hand. The user moves the body 18 axially toward the second end portion 14 of the support frame 12 compressing the biasing spring 29. The compression of the biasing spring 29 allows vane 41, 42 to be withdrawn from the space 38 defined by yoke arms 39, 40. The body 18 may then be rotated axially so that the desired blade 21, 25, 26 configuration is positioned for engagement with the windshield 44 as the windshield wiper mechanism is operated. Engagement of vane 41 in space 38 causes the toothed blade 25 and the shaving blade 26 to engage the windshield 44. Engagement of vane 42 causes the flexible wiper blade 21 to engage with the windshield.

The body 18 is released so that the locking means 33 re-engages by expansion of biasing spring 29 forcing first end 19 of body 18 toward first end 13 of support frame 12 positionally securing the body 18 in an orientation so that the desired blade 21, 25, 26 combination is used.

If the second embodiment of the locking means 33 is used, the blade selection procedure is the same except the compression of the biasing spring 29 allows peg 34, 35 to be withdrawn from the arcuate elongated hole 36 and thereafter axial rotation of the body allows the user to select the desired windshield contacting blade configuration by engaging one peg 34, 35 or the other peg 34, 35 in elongated arcuate hole 36.

Having thusly described my invention, what I desire to protect by Letters Patent, and

I claim:

1. A vehicle windshield wiper blade assembly for removing liquid, ice and frost from a vehicle windshield as a windshield wiper arm moves in a first direction and in an opposing second direction across the windshield comprising in combination:
   a frame having a first end portion and a second end portion supporting an axially rotatable elongate body;
   the body having a pivot axle at a first end portion communicating with the frame and a pivot axle at a second end portion communicating with the frame and carrying three spaced apart parallel windshield engaging blades extending generally radially from the body;
   a locking means to prevent undesired axial rotation of the body relative to the frame; and
   a biasing spring carried on one pivot axle between an end portion of the body and the frame to positionally bias the body to engage with the locking means.

2. The windshield wiper blade assembly of claim 1 further comprising:
   a releasable windshield wiper arm engaging mechanism carried on a back portion of the frame.

3. The windshield wiper blade assembly of claim 1 wherein one of said blades is:
   an elongate semi-rigid toothed blade defining a plurality of teeth in an edge portion opposite the body for scoring frost and ice on the windshield as the wiper blade assembly is moved in a first direction by the windshield wiper arm.

4. The windshield wiper blade assembly of claim 1 wherein one of said blades is:
   an elongate semi-rigid shaving blade having a sharpened edge portion opposite the body for shaving scored frost and ice off the windshield as the wiper blade assembly is moved in a second direction by the windshield wiper arm.

5. The windshield wiper blade assembly of claim 1 wherein one of said blades is:
   a flexible liquid removing wiper blade carried by the body equi-distant from the two other windshield engaging blades for removing rain and liquid from the windshield as the wiper blade assembly is moved in a first and second direction by the windshield wiper arm.

6. The windshield wiper blade assembly of claim 5 wherein:
   the body defines an elongate axially aligned slot to releasably carry a replaceable flexible liquid removing wiper blade therein, the slot having a flange at each elongate edge portion to releasably engage with and positionally secure the replaceable flexible wiper blade in the elongate slot.

7. The windshield wiper blade assembly of claim 1 wherein:
   the frame is elongate having a first end portion proximate a first end portion of the body, and a second end portion proximate a second end portion of the body and having a back portion extending between the first end portion and the second end portion.

8. The windshield wiper blade assembly of claim 1 wherein:
   the body is formed of a thermal plastic.

9. The windshield wiper blade assembly of claim 1 wherein:
   the body and two of the blades are formed of a thermal plastic.

10. The windshield wiper blade assembly of claim 1 wherein:
    the body is formed of high density polyethylene.

11. The windshield wiper blade assembly of claim 1 wherein:

the locking means is a yoke carried by the frame proximate one end portion of the body, the yoke having two parallel spaced apart arms defining a space therebetween; and two vanes carried on the circumferential surface of the body at diametrically opposite positions for releasable alternative engagement in the space defined between the yoke arms.

12. The windshield wiper blade assembly of claim 1 wherein:

the locking means is an arcuate elongated hole defined in one end portion of the frame spacedly adjacent the pivot axle; and at least two spaced apart protuberances are carried on an end portion of the body for alternative releasable engagement with the arcuate elongated hole defined in the frame end portion.

* * * * *